United States Patent
Glickman et al.

(10) Patent No.: US 10,920,950 B1
(45) Date of Patent: Feb. 16, 2021

(54) VEHICLE LIGHTING SYSTEM AND LIGHTING METHOD

(71) Applicant: Ford Global Technologies, LLC, Dearborn, MI (US)

(72) Inventors: David Brian Glickman, Southfield, MI (US); Stuart C. Salter, White Lake, MI (US); Paul Kenneth Dellock, Northville, MI (US); Mark A. Wisneski, Dearborn, MI (US); Robert William Miller, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/727,177

(22) Filed: Dec. 26, 2019

(51) Int. Cl.
| | |
|---|---|
| *F21S 41/50* | (2018.01) |
| *F21S 41/151* | (2018.01) |
| *H05B 45/10* | (2020.01) |
| *B60Q 1/26* | (2006.01) |
| *B60Q 1/28* | (2006.01) |
| *F21S 41/20* | (2018.01) |

(52) U.S. Cl.
CPC .......... *F21S 41/50* (2018.01); *B60Q 1/2696* (2013.01); *B60Q 1/28* (2013.01); *F21S 41/151* (2018.01); *F21S 41/285* (2018.01); *H05B 45/10* (2020.01)

(58) Field of Classification Search
CPC ........ F21S 41/50; F21S 41/151; F21S 41/285; H05B 45/10; B60Q 1/2696; B60Q 1/28
See application file for complete search history.

(56) References Cited

U.S. PATENT DOCUMENTS

| | | | | |
|---|---|---|---|---|
| 4,816,968 | A * | 3/1989 | Yamada | B60Q 1/28 362/268 |
| 9,783,122 | B1* | 10/2017 | VanEpps | B60R 11/00 |
| 10,059,256 | B1* | 8/2018 | Diedrich | B60Q 1/2661 |
| 10,281,113 | B1* | 5/2019 | Salter | F21S 41/153 |
| 10,309,610 | B2 | 6/2019 | Glickman et al. | |
| 2010/0232171 | A1* | 9/2010 | Cannon | B29C 45/14811 362/509 |
| 2015/0138807 | A1* | 5/2015 | Salter | B60Q 1/2661 362/510 |
| 2016/0195242 | A1* | 7/2016 | Salter | B60Q 1/2661 362/510 |
| 2016/0288700 | A1* | 10/2016 | Chen | B60Q 1/28 |
| 2017/0043709 | A1* | 2/2017 | Dellock | F21V 23/003 |
| 2018/0170247 | A1* | 6/2018 | Ramos, II | B60Q 1/0041 |
| 2018/0334088 | A1* | 11/2018 | Salter | B60Q 1/442 |
| 2019/0256025 | A1* | 8/2019 | Dickson | F21S 43/26 |
| 2019/0271458 | A1* | 9/2019 | Brown | F21S 41/285 |
| 2019/0329700 | A1* | 10/2019 | Morimura | B60Q 1/50 |

* cited by examiner

*Primary Examiner* — Mary Ellen Bowman

(74) *Attorney, Agent, or Firm* — David Coppiellie, Esq.; Carlson, Gaskey & Olds, P.C.

(57) ABSTRACT

A vehicle lighting system includes, among other things, a grille that extends across an opening in a vehicle. The system also includes a light bar assembly having lights that are disposed aft the grille relative to a general orientation of the vehicle. The lights are configured to be activated to emit light through grille openings.

18 Claims, 6 Drawing Sheets

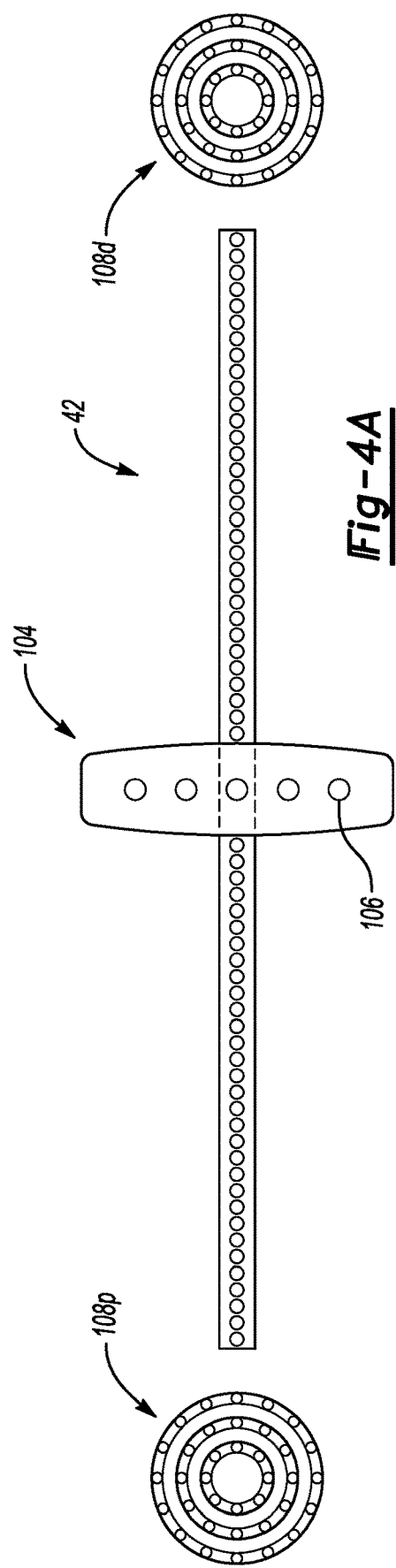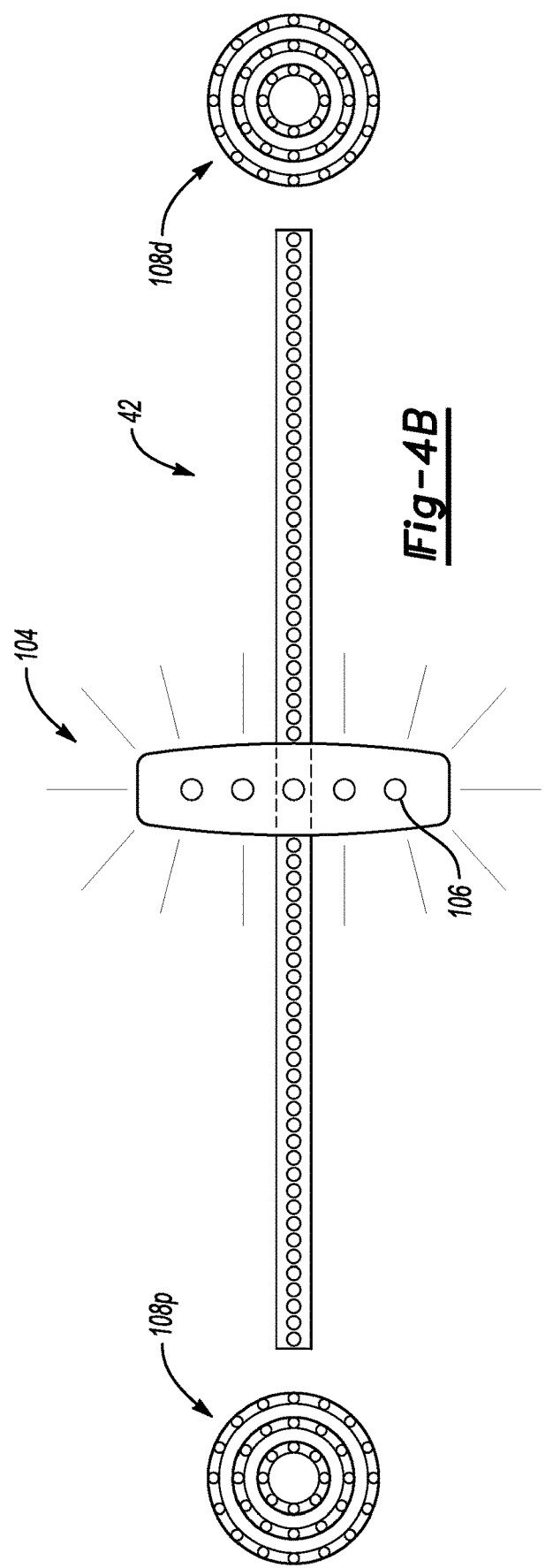

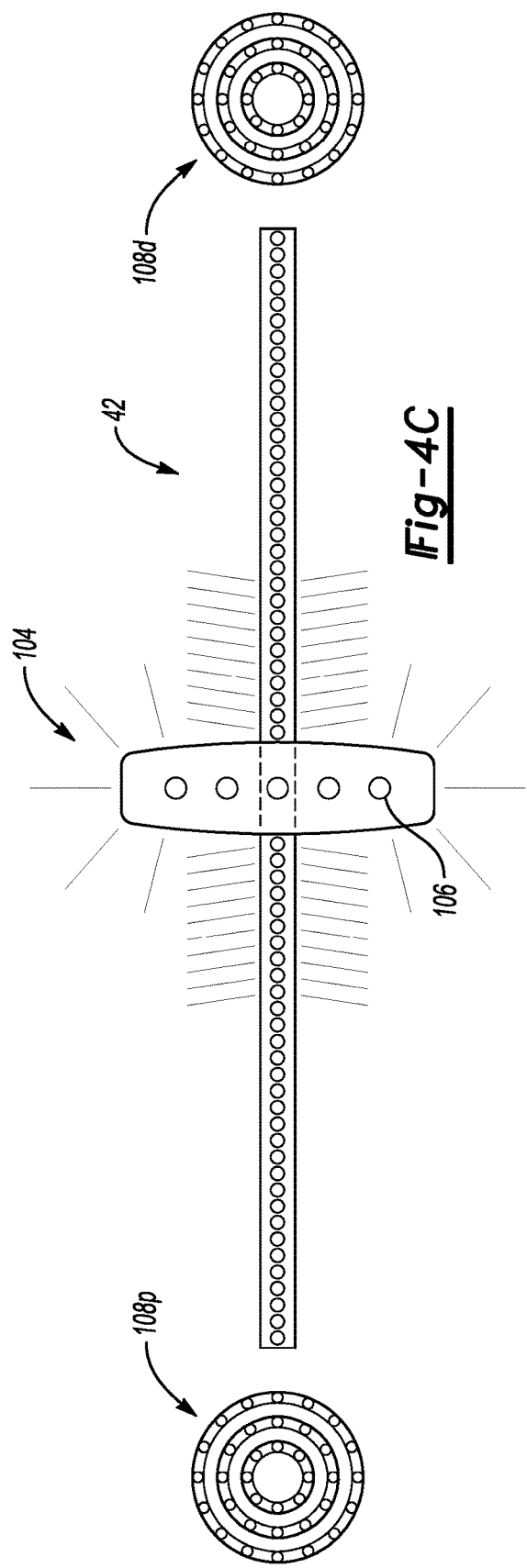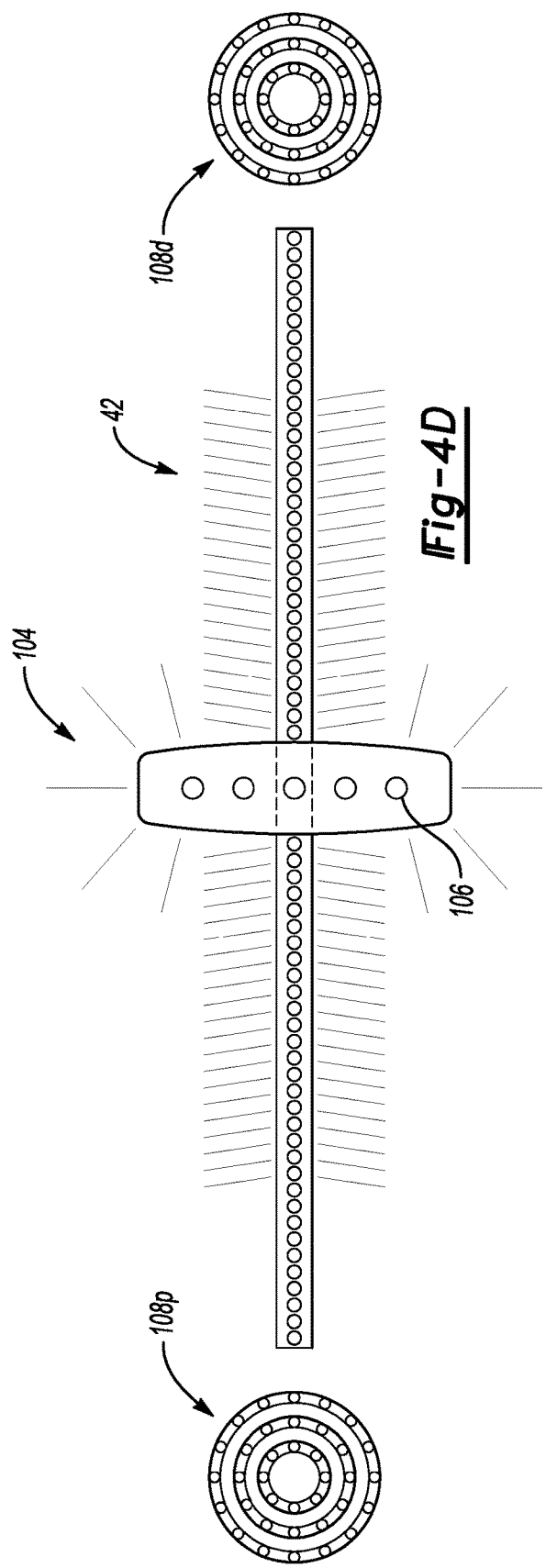

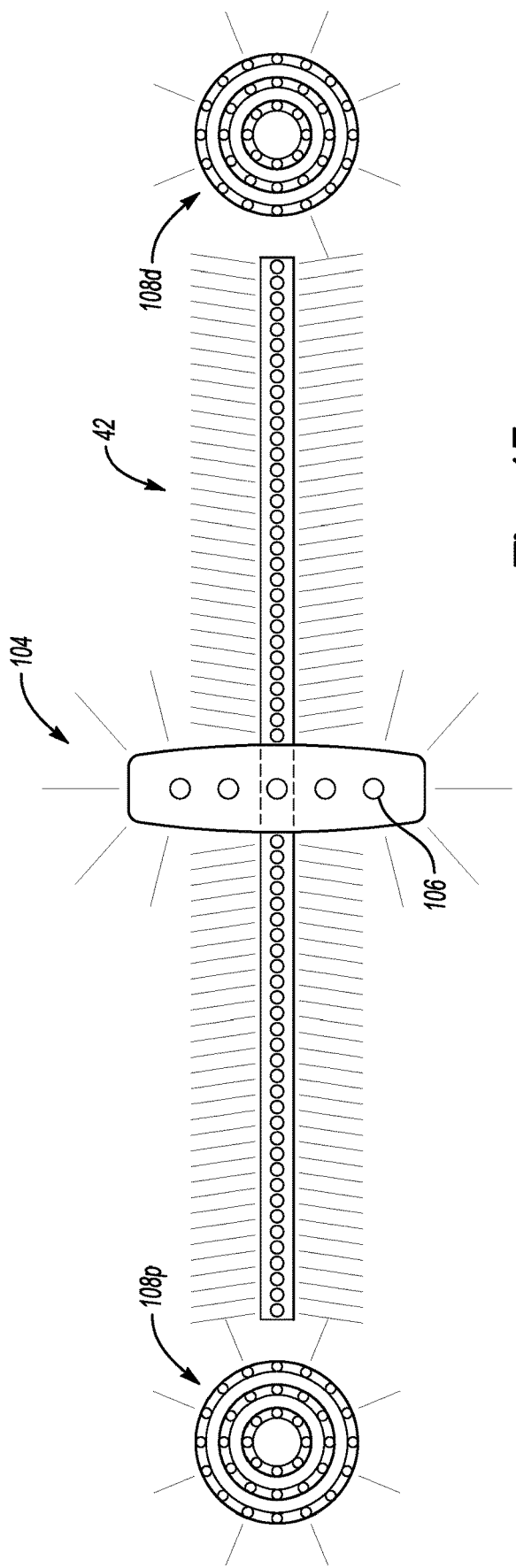

VEHICLE LIGHTING SYSTEM AND LIGHTING METHOD

TECHNICAL FIELD

This disclosure relates generally to a lighting system for a vehicle and, more particularly, to a lighting system that can emit light through openings in a grille of the vehicle.

BACKGROUND

Vehicles can include various types of lighting assemblies. The lighting assemblies can be, for example, headlamps, tail lamps, side markers, decorative, or some combination of these. Lighting assemblies can illuminate for aesthetic purposes, to provide indicators, to illuminate desired areas, etc.

SUMMARY

A vehicle lighting system according to an exemplary aspect of the present disclosure includes, among other things, a grille that extends across a body opening in a vehicle. The system also includes a light bar assembly having lights that are disposed aft the grille relative to a general orientation of the vehicle. The lights are configured to be activated to emit light through grille openings in the grille.

In another example of the foregoing lighting system, the lights are disposed along an axis that extends longitudinally from a passenger side of the opening to a driver side of the grille opening.

Another example of any of the foregoing lighting systems includes a concealing structure between the lights and the grille. The lights are configured to emit light through the concealing structure when the lights are activated. The concealing structure is configured to conceal the lights when the lights are deactivated.

In another example of any of the foregoing lighting systems, the system further includes a diffuser that is disposed between the lights and the concealing structure. The lights are configured to emit light through the diffuser when the lights are activated.

Another example of any of the foregoing lighting systems includes a control module to deactivate the lights such that the lights are concealed by the concealing structure when the vehicle is viewed from a position forward the vehicle.

Another example of any of the foregoing lighting systems includes a storage area that is vertically beneath the grille. The lights are configured to be activated to emit light to illuminate the storage area.

Another example of any of the foregoing lighting systems includes a drawer having an interior that provides the storage area. The drawer is slidable between an accessing position and a closed position. The lights are configured to illuminate the interior of the drawer when the drawer is in the accessing position.

In another example of any of the foregoing lighting systems, the lights include a plurality of Light Emitting Diodes.

Another example of any of the foregoing lighting systems includes a control module that is configured to sequentially activate individual lights.

In another example of any of the foregoing lighting systems, the control module is configured to sequentially activate individual lights such that light is first emitted from the light bar assembly near a cross-vehicle center of the vehicle and then is emitted from a laterally outer area on a passenger side of the light bar assembly and a laterally outer area on a driver side of the light bar assembly.

Another example of any of the foregoing lighting systems includes a passenger side lighting assembly disposed laterally outside a passenger side of the opening. The passenger side lighting assembly has at least one passenger side lighting assembly light and at least one passenger side lighting assembly lens. The lighting system further includes a driver side lighting assembly disposed laterally outside a driver side of the opening. The driver side lighting assembly has at least one driver side lighting assembly light and at least one driver side lighting assembly lens. The lighting system further includes a control module that is configured to activate the passenger and driver side lighting assembly lights after activating at least some of the individual lights within the plurality of lights of the light bar assembly.

In another example of any of the foregoing lighting systems, the passenger and driver side lenses are disposed within respective first and second vehicle structures. The control module is configured to deactivate the passenger and driver side lighting assembly lights such that the passenger and driver side lighting assembly lenses have the same appearance as the respective first and second vehicle structure.

In another example of any of the foregoing lighting systems, exterior surfaces of the passenger and driver side lenses and the first and second vehicle structures are painted.

In another example of any of the foregoing lighting systems, the first and second vehicle structures are different portions of a vehicle fascia.

In another example of any of the foregoing lighting systems, the control module is configured to sequentially activate individual lights of the light bar assembly such that light is first emitted from the light bar assembly near a cross-vehicle center of the vehicle, and then from both a laterally outer area on a passenger side of the light bar assembly and a laterally outer area on a driver side of the light bar assembly.

A lighting method according to another exemplary embodiment of the present disclosure includes, among other things, providing a light bar assembly aft a grille of a vehicle relative to a general orientation of the vehicle. The method further includes activating lights of the light bar assembly to emit light through grille openings in the grille.

Another example of the foregoing lighting method includes sequentially activating individual lights such that light is first emitted from the light bar assembly near a cross-vehicle center of the vehicle and then is emitted from a laterally outer area on a passenger side of the light bar assembly and a laterally outer area on a driver side of the light bar assembly.

Another example of any of the foregoing lighting methods includes, after sequentially activating the individual lights within the plurality of lights, activating a first lighting assembly disposed laterally outside a passenger side of the grille, and activating a second lighting assembly disposed laterally outside a driver side of the grille.

Another example of any of the foregoing lighting methods includes emitting light from the lights and then through the grille openings in the grille during the activating, and using a concealing structure to conceal the lights when the lights are deactivated.

Another example of any of the foregoing lighting methods includes activating the lights to illuminate an interior of a slidable drawer.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIGS. 4A-4E illustrate stages in a lighting effect provided by selectively activating, among other things, lights of the light bar assembly.

DETAILED DESCRIPTION

This disclosure details exemplary systems and methods of emitting light through openings in a grille of a vehicle. A lighting assembly includes light sources that are activated to emit the light and provide an illuminated area. The light sources can be concealed when deactivated. In some examples, the light sources can be selectively activated to change the illuminated area.

Figure 1:
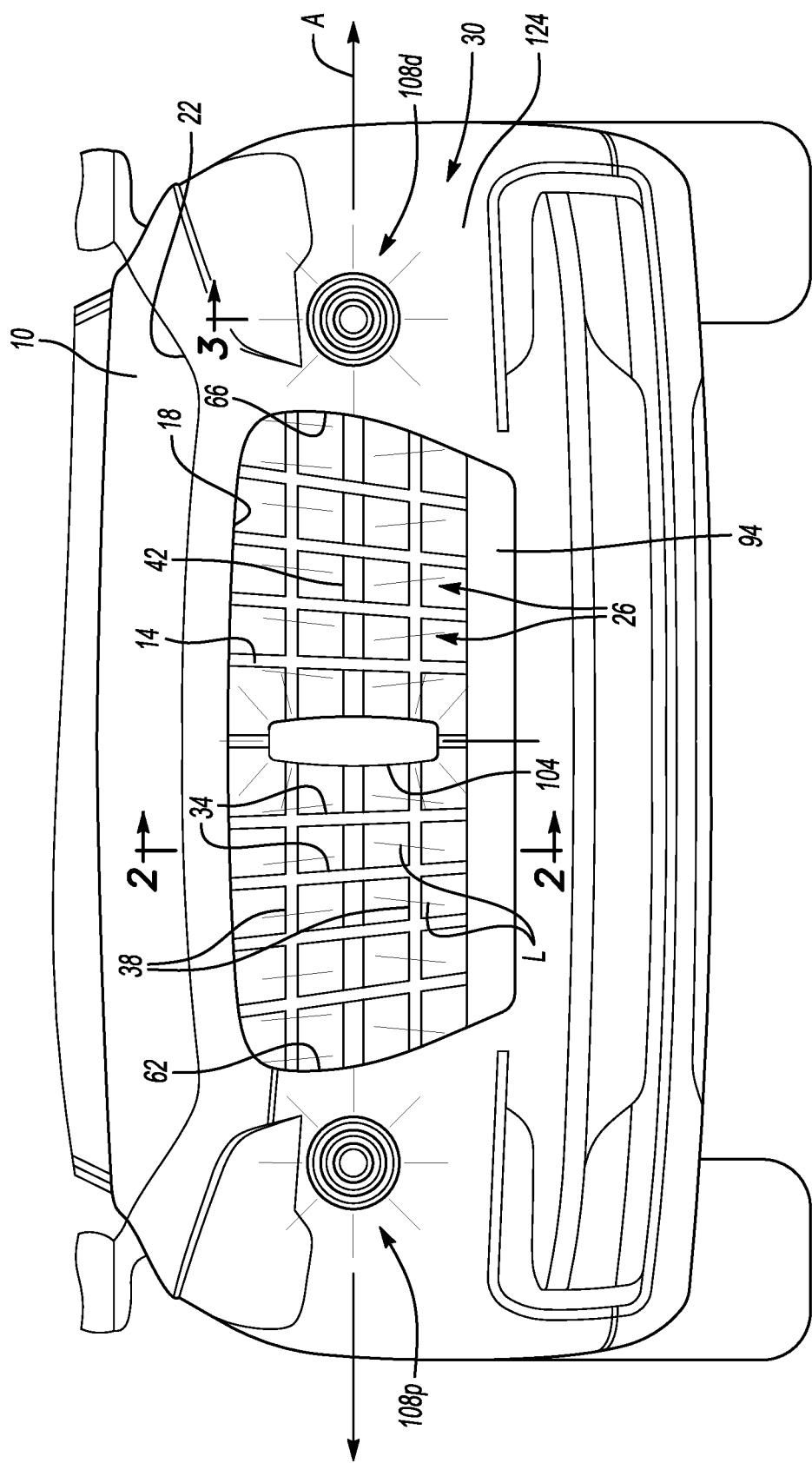
FIG. 1 shows a front view of a vehicle having grille and a light bar assembly.

With reference to FIG. 1, an example vehicle 10 includes a grille 14 that extends across a body opening 18 in a body 22 of the vehicle 10. The grille 14 includes a plurality of grille openings 26 that permit a flow of air to move through the body opening 18 between an interior area of the vehicle 10 and an exterior of the vehicle 10. The exemplary grille 14 is at a front end 30 of the vehicle 10. In other examples, the grille 14 could extend across a body opening located in another area of the vehicle 10.

The grille 14 in the exemplary embodiment includes a plurality of vertical bars 34 and a plurality of horizontal bars 38. Some of the grille openings 26 have a perimeter defined entirely by a combination of the vertical bars 34 and horizontal bars 38. Other grille openings 26 have a perimeter partially defined by the vertical bars 34 and the horizontal bars 38, and further partially defined by the body 22 of the vehicle 10.

Figure 2:
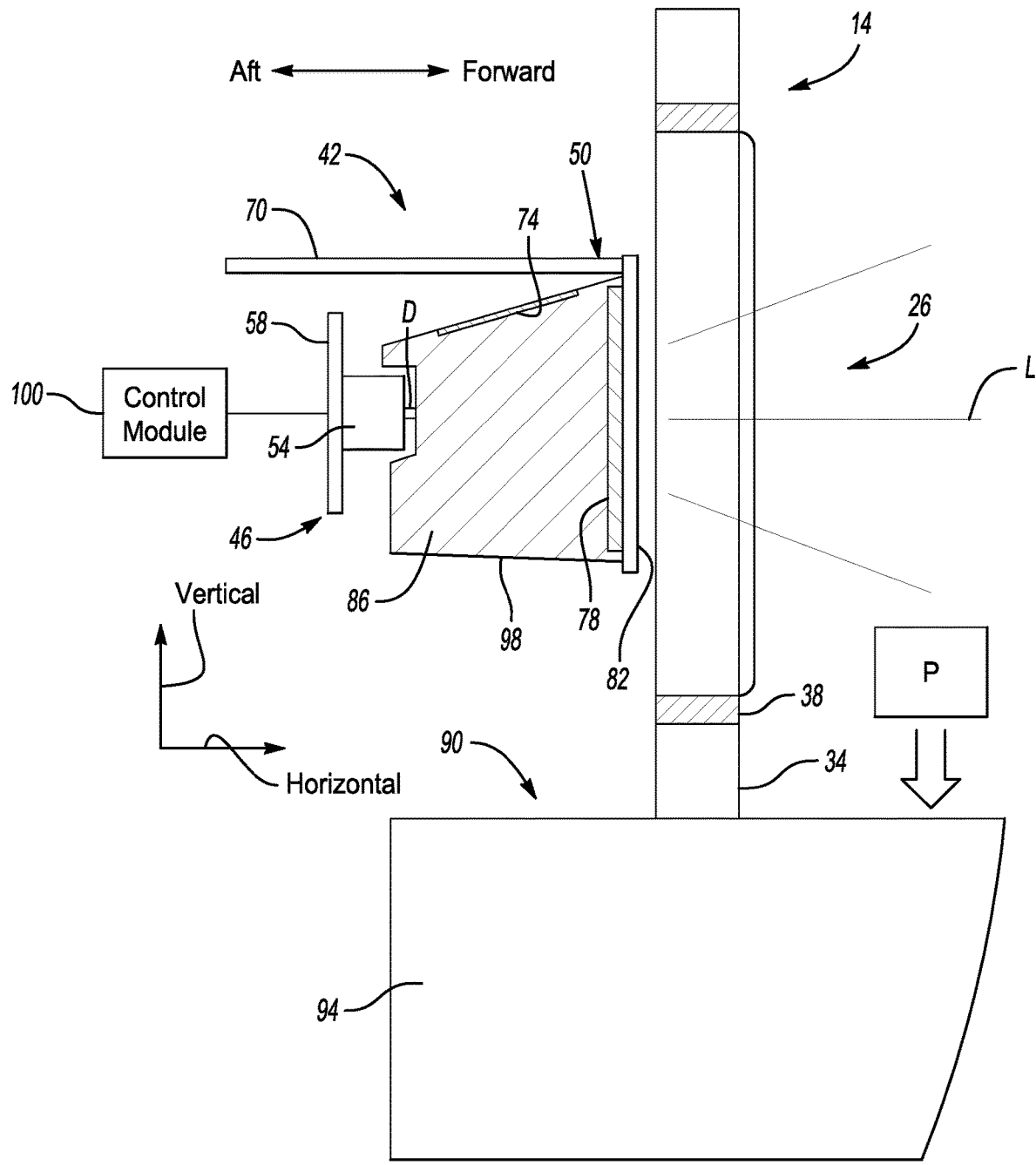
FIG. 2 illustrates a section view taken at line 2-2 in FIG. 1.

With reference now to FIG. 2 and continuing reference to FIG. 1, a light bar assembly 42 is disposed aft the grille 14. Aft is with reference to the general orientation of the vehicle 10.

The light bar assembly 42 includes a light source 46 and a housing 50. The various components of the light bar assembly 42 can be sealed relative to each other to block, among other things, moisture from contacting the light source 46.

In the exemplary embodiment, the light source 46 is provided by a plurality of Light Emitting Diodes (LEDs) 54, which are secured to a printed circuit board 58. The printed circuit board 58 can provides, among other things, a heat sink for the LEDs 54.

The plurality of LEDs 54 are disposed along an axis A that extends longitudinally across the body opening 18 from a passenger side 62 of the body opening 18 to a driver side 66 of the body opening 18. The light bar assembly 42 includes a single horizontally extending row of LEDs 54 in the example embodiment. In another example, the light bar assembly 42 could include more than one horizontal row of the LEDs 54. The light bar assembly 42 could include, for example from 30 to 50 of the LEDs 54 on a passenger side of the vehicle 10 and from 30 to 50 of the LEDs 54 on a driver side of the vehicle 10.

When activated, the LEDs 54 emit light L that moves through the grille openings 26. When all the LEDs 54 of the light bar assembly 42 are emitting light L as shown in FIG. 1, a horizontally extending band of light is visible to an observer viewing the front end 30 of the vehicle 10 from a position in front of the vehicle 10. The horizontal band of light provided by the LEDs 54 in the lighting assembly 52 extends from the passenger side 62 of the body opening 18 to the driver side 66 of the body opening 18.

The exemplary LEDs 54 are each top fire, 0.5 watt, white LEDs. Because the exemplary LEDs 54 are top fire LEDs, most of the light emitted from the LEDs 54 propagates forward from the LEDs 54 toward the grille 14 and the grille openings 26.

The lens body 86 is acrylic in this example. The LEDs 54 are spaced a distance D from the lens body 86 to permit light emitted from the LEDs 54 to spread out somewhat before entering the lens body 86. This can further help to avoid a user viewing points of light originating from the individual LEDs 54.

The housing 50 includes, among other things, housing cover flange 70, a reflector 74, a diffuser 78, a concealing structure 82, and a lens body 86. The housing cover flange 70 is, in the exemplary embodiment, opaque to help prevent light emitted from the LEDs 54 from escaping vertically upward from the light bar assembly 42.

The reflector 74, in the exemplary embodiment, is disposed in a vertically upper area of the lens body 86. In this example, the reflector 74 provided by laser etched optics within a vertically upward facing surface of the lens body 86. The reflector 74 helps to redirect light emitted from the LEDs 54 from escaping vertically upward through the lens body 86.

The diffuser 78 is disposed forward the lens body 86. The diffuser 78 can be formed of a polymer-based, milky colored material provided to diffuse light emitted from the LEDs 54. The diffuser 78 can help to prevent hot spots of visible light emitted from the LEDs 54 from being viewed by an individual that is viewing the light bar assembly 42. The diffuser 78 can be formed with the lens body 86 in a two-shot molding process. In an exemplary embodiment, the lens body 86 is first molded from an acrylic material. The diffuser 78 is then molded in a second shot.

The concealing structure 82 conceals the remaining portions of the light bar assembly 42 from view when the LEDs 54 are not activated to emit light. The concealing structure 82 can be a dark color, such as black, to blend with the surrounding areas the vehicle 10. As the concealing structure 82 is a dark color, a user viewing the front of the vehicle would not readily notice the light bar assembly 42 when the LEDs 54 are not activated. In the exemplary embodiment, the concealing structure 82 is considered a dead front flange.

Vertically beneath the grille 14 and the body opening 18 of the vehicle 10 is a storage area 90 of the vehicle 10. In the exemplary embodiment, the storage area 90 is provided by an interior of a drawer 94. The drawer 94 can slide horizontally back and forth between the closed position shown in FIG. 1 and the accessing position shown in FIG. 2.

When in the accessing position of FIG. 2, a user can place objects, such as packages P, within the storage area 90. The drawer 94 can then move from the accessing position of FIG. 2 back to the closed position of FIG. 1. The drawer 94 may be lockable when in the closed position and accessible only by an authorized user. The storage area 90 provided by the drawer 94 can thus provide be securable. The packages P could be delivered to the storage area 90 of the vehicle 10 while the vehicle 10 is parked. The user of the vehicle could then retrieve the packages P at a later time.

The LEDs 54 may be activated to emit light when the drawer 94 is in the accessing position. Light from the LEDs 54, some of which may be reflected vertically downward by the reflector 74, can move to the storage area 90 to illuminate the storage area 90 to assist a visibility in this area. The lens body 86 of the light bar assembly 42 is generally open on a vertically lower side 98 to facilitated movement of light from the LEDs 54 through the lens body 86 to the storage area 90.

An optional embodiment of the present disclosure may include a switch (not shown) associated with the drawer 94. A user can activate the switch to increase an intensity of light emitted from the LEDs 54 to provide more illumination to the storage area 90 provided by the interior of the drawer 94.

An optional embodiment of the present disclosure could instead, or additionally, include a sound exciter that emits an audible clicking sound as the drawer 94 is transitioned between the accessing position and the closed position. The audible clicking sound can provide audio feedback to the user about the position of the drawer 94.

As an option, the vehicle 10 could include a camera that provides an image of the storage area 90 to a user so that the user can, for example, confirm delivery of the package P. Access to the storage area 90 of the drawer 94 could be limited to users that have been authorized by scanning a barcode, entering a password, etc.

The light bar assembly 42 is operably connected to a control module 100 of the vehicle. The control module 100 is configured to selectively activate the LEDs 54 to emit light and to deactivate the LEDs 54 so that the LEDs 54 do not emit light. In the exemplary embodiment, the control module 100 can activate individual LEDs 54 within the light bar assembly 42 to provide various lighting effects.

Further, if the drawer 94 is in the accessing position, the control module 100 could activate the LEDs 54 and generate an alert to the user if the user attempts to put the vehicle 10 into a drive gear. The alert could include an audible alert, a message on a touch screen device, a visible alert within an interior of the vehicle 10, or some combination of these.

The control module 100 can be a dedicated control unit or be incorporated into an already existing vehicle control unit, and can include a processor, memory, and one or more input and/or output (I/O) device interface(s) that are communicatively coupled via a local interface. The local interface can include, for example but not limited to, one or more buses and/or other wired or wireless connections. The control module 100 may be a hardware device for executing software, particularly software stored in memory that may include one or more separate programs, each of which includes an ordered listing of executable instructions for implementing logical functions. The control module 100 can be a custom made or commercially available processor, a central processing unit (CPU), an auxiliary processor among several processors associated with the computing device, a semiconductor based microprocessor (in the form of a microchip or chip set), or generally any device for executing software instructions.

In addition to controlling the light bar assembly 42, the control module 100, in the exemplary embodiment, can selectively activate and deactivate other lighting assemblies of the vehicle.

One such other lighting assembly is an illuminatable badge 104 disposed, in the exemplary embodiment, in the body opening 18 within the grille 14, and at a cross-vehicle center of the vehicle 10. The badge 104 includes LEDs 106 that can be activated to emit light. The activation and deactivation of the LEDs of the badge 104 can be controlled by the control module 100. During ordinary drive cycles of the vehicle 10, when the vehicle 10 is moving, the badge 104 could be illuminated, but with an intensity that adjusts should the vehicle 10 have its headlights transition into a high beam headlight mode. That is, the intensity of light emitted from the LEDs 106 of the badge 104 can depend on headlights of the vehicle 10 being in the high beam or low beam mode.

Other lighting assembly controlled by the control module 100 include a passenger side lighting assembly 108p and a driver side lighting assembly 108d. The passenger side lighting assembly 108p is disposed laterally outside the passenger side 62 of the body opening 18, the driver side lighting assembly 108d is disposed laterally outside the driver side 66 of the body opening 18.

Figure 3:
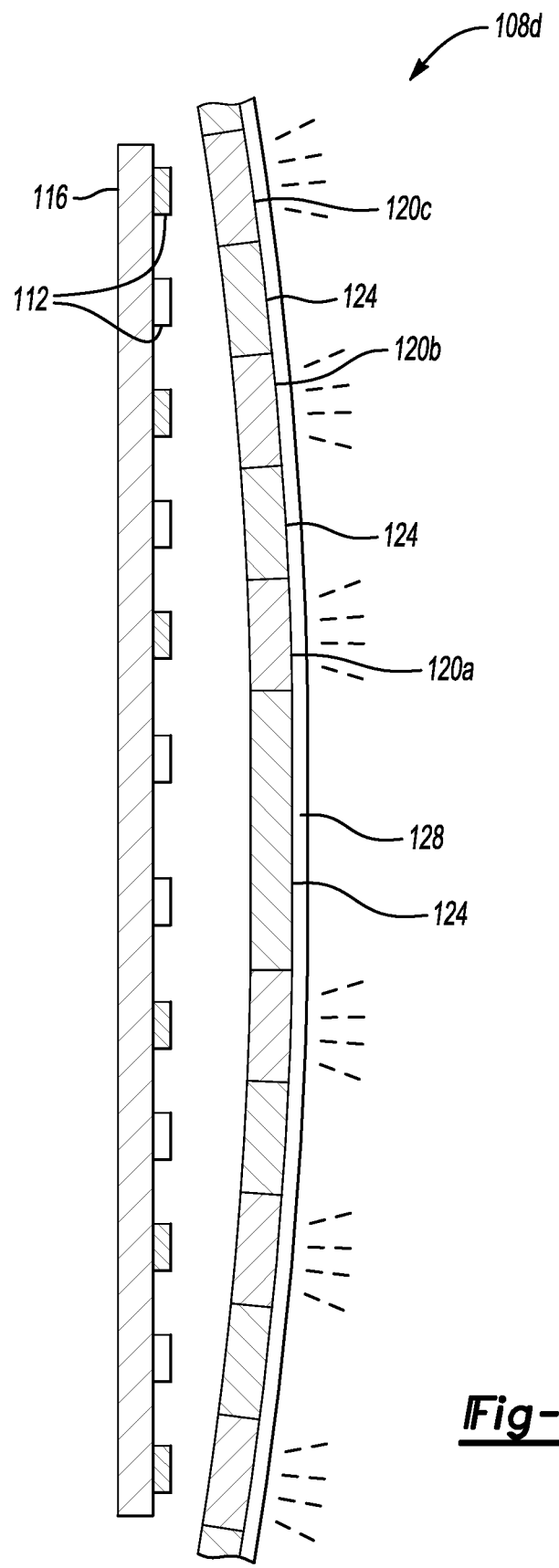
FIG. 3 illustrates a section view taken at line 3-3 in FIG. 1.

FIG. 3 illustrates a section view through the driver side lighting assembly 108d. The passenger side lighting assembly 108p is constructed similarly to the driver side lighting assembly 108d.

The driver side lighting assembly 108d includes, among other things, at least one driver side lighting assembly light. In this example, the at least one driver side lighting assembly 108d includes a plurality of LEDs 112 mounted to a printed circuit board 116. The driver side lighting assembly 108d further includes driver side lighting assembly lenses 120a-120c disposed within a vehicle structure 124.

In the exemplary embodiment, the vehicle structure 124 is a portion of a vehicle fascia that provides at least some of the perimeter of the body opening 18. In the exemplary embodiment, a layer of paint 128 covers exterior facing surfaces of the lenses 120a-120c and the vehicle structure 124. When the control module 100 activates all the LEDs 112, light from the LEDs 112 illuminates the lenses 120a-120c.

The lenses 120a-120c, in the exemplary embodiment, are annular. The individual lenses each having a varied diameter. The lens 120a is the radially innermost lens, and the lens 120c is the radially outermost lens.

The control module 100 can, in some examples, cause the LEDs 112 directly aft the lens 120a to activate. After which, the LEDs 112 directly aft the lens 120b are activated, and then finally the LEDs 112 direct aft the lens 120c. The lenses 120a-120c can thus be illuminated sequentially.

When the lenses 120a-120c are not illuminated, the layer of paint 128 conceals the lenses 120a-120c such that the driver side lighting assembly 108d is concealed and appears to be a continuation of the vehicle structure 124. Notably, the LEDs 112 must illuminate with sufficient light to propagate through the associated lenses 120a-120c and the layer of paint 128.

The control module 100 can control the light bar assembly 42 and, in the exemplary embodiment, additionally control the badge 104, the passenger side lighting assembly 108p, and the driver side lighting assembly 108d to provide various lighting effects. One of which will now be explained in connection with FIGS. 4A-4E.

In FIG. 4A, the LEDs 106 of the badge 104, the LEDs 54 of the light bar assembly 42, and the LEDs 112 of the lighting assemblies 108d and 108p are deactivated such that light is not emitted from the badge 104, the light bar assembly 42, or the lighting assemblies 108d and 108p.

FIG. 4B shows the control module 100 having activated the LEDs 106 within the badge 104 such that the badge 104 is illuminated. This begins a lighting effect provided by the badge 104, the light bar assembly 42, and the lighting assemblies 108d and 108p.

FIG. 4C shows the control module 100 having then activated some of the LEDs 54 within the light bar assembly 42 while maintaining the illumination of the badge 104. The LEDs 54 of the light bar assembly 42 are sequentially activated such that the LEDs 54 laterally closer to the badge 104 are illuminated prior to the LEDs 54 laterally further outboard from the badge 104.

Notably, the illumination could be smoothed as the light from the light bar assembly 42 propagates laterally outward from the badge 104 and the cross-vehicle center. To smooth the illumination, the control module 100 can control the intensity of light emitted from the individual LEDs. For example, when sequentially activating the LEDs 54 moving laterally outward from the badge 104, the LEDs 54 could be first activated at 50% intensity, and then to 100% intensity after a laterally adjacent LED 54 has been activated 50% intensity. This results in the light emitted from the light bar assembly 42 appearing to grow and extend smoothly laterally outward from the badge 104 toward the passenger side and driver side of the body opening 18.

FIG. 4D shows a later stage in the lighting effect where more of the LEDs 54 of the light bar assembly 42 have been sequentially illuminated to provide a bar of light from the light bar assembly 42 that is longer than the bar of light emitted from the light bar assembly 42 in FIG. 4C.

FIG. 4E shows the control module having activated all of the LEDs 54 of the light bar assembly 42 and additionally activating the LEDs 112 of the lighting assemblies 108p and 108d. The rings of the lighting assemblies 108p and 108d could be sequentially illuminated as previously described in connection with the description of the lighting assembly 108d.

The lighting effect described in connection with FIGS. 4A to 4E provides light that begins at the badge 104 and then appears to grow laterally outward until reaching the lighting assemblies 108p and 108d. In other words, light starts at the badge 104, and the gradually moves out to the passenger side 62 and driver side 66 of the body opening 18. The light then jumps to the lighting assemblies 108p and 108d.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lighting system, comprising:
a grille extending across a body opening in a vehicle;
a light bar assembly having a plurality of lights that are disposed aft the grille relative to a general orientation of the vehicle, the plurality of lights configured to be activated to emit light through a plurality of grille openings in the grille; and
a concealing structure between the plurality of lights and the grille, the plurality of lights configured to emit light through the concealing structure when the plurality of lights are activated, the concealing structure configured to conceal the plurality of lights when the plurality of lights are deactivated.

2. The vehicle lighting system of claim 1, wherein the plurality of lights are disposed along an axis extending longitudinally from a passenger side of the opening to a driver side of the body opening.

3. The vehicle lighting system of claim 1, further comprising a diffuser disposed between the plurality of lights and the concealing structure, the plurality of lights configured to emit light through the diffuser when the plurality of lights are activated.

4. The vehicle lighting system of claim 1, further comprising a control module to deactivate the plurality of lights such that the plurality of lights are concealed by the concealing structure when the vehicle is viewed from a position forward of the vehicle.

5. The vehicle lighting system of claim 1, further comprising a storage area that is vertically beneath the grille, the plurality of lights configured to be activated to emit light to illuminate the storage area.

6. The vehicle lighting system of claim 5, further comprising a drawer having an interior that provides the storage area, the drawer slidable between an accessing position and a closed position, the plurality of lights configured to illuminate the interior of the drawer when the drawer is in the accessing position.

7. The vehicle lighting system of claim 1, wherein the plurality of lights comprises a plurality of Light Emitting Diodes.

8. The vehicle lighting system of claim 1, further comprising a control module configured to sequentially activate individual lights within the plurality of lights.

9. The vehicle lighting system of claim 8, wherein the control module is configured to sequentially activate individual lights within the plurality of lights such that light is first emitted from the light bar assembly near a cross-vehicle center of the vehicle and then is emitted from a laterally outer area on a passenger side of the light bar assembly and a laterally outer area on a driver side of the light bar assembly.

10. A vehicle lighting system, comprising:
a grille extending across a body opening in a vehicle;
a light bar assembly having a plurality of lights that are disposed aft the grille relative to a general orientation of the vehicle, the plurality of lights configured to be activated to emit light through a plurality of grille openings in the grille;
a passenger side lighting assembly disposed laterally outside a passenger side of the opening, the passenger side lighting assembly having at least one passenger side lighting assembly light and at least one passenger side lighting assembly lens;
a driver side lighting assembly disposed laterally outside a driver side of the opening, the driver side lighting assembly having at least one driver side lighting assembly light and at least one driver side lighting assembly lens; and a control module that is configured to activate the passenger and driver side lighting assembly lights after activating at least some of the individual lights within the plurality of lights of the light bar assembly.

11. The vehicle lighting system of claim 10, wherein the passenger and driver side lenses are disposed within respective first and second vehicle structures, the control module configured to deactivate the passenger and driver side lighting assembly lights such that the passenger and driver side lighting assembly lenses have the same appearance as the respective first and second vehicle structure.

12. The vehicle lighting system of claim 11, wherein exterior surfaces of the passenger and driver side lenses and the first and second vehicle structures are painted.

13. The vehicle lighting system of claim 12, wherein the first and second vehicle structures are different portions of a vehicle fascia.

14. The vehicle lighting system of claim 11, wherein the control module is configured to sequentially activate individual lights within the plurality of lights of the light bar assembly such that light is first emitted from the light bar assembly near a cross-vehicle center of the vehicle, and then from both a laterally outer area on a passenger side of the light bar assembly and a laterally outer area on a driver side of the light bar assembly.

15. A lighting method, comprising:
providing a light bar assembly aft a grille of a vehicle relative to a general orientation of the vehicle; and
activating a plurality of lights of the light bar assembly to emit light through a plurality of grille openings in the grille; and
emitting light from the plurality of lights and then through the plurality of grille openings in the grille during the activating, and using concealing structure to conceal the plurality of lights when the plurality of lights are deactivated.

16. The lighting method of claim 15, further comprising sequentially activating individual lights within the plurality of lights such that light is first emitted from the light bar assembly near a cross-vehicle center of the vehicle and then is emitted from a laterally outer area on a passenger side of the light bar assembly and a laterally outer area on a driver side of the light bar assembly.

17. The lighting method of claim 16, further comprising, after sequentially activating the individual lights within the plurality of lights, activating a first lighting assembly disposed laterally outside a passenger side of the grille, and activating a second lighting assembly disposed laterally outside a driver side of the grille.

18. The lighting method of claim 15, further comprising activating the lights to illuminate an interior of a slidable drawer.

* * * * *